H. HIRSCH.
EDUCATIONAL DEVICE.
APPLICATION FILED FEB. 19, 1920.
1,417,828.
Patented May 30, 1922.
2 SHEETS—SHEET 1.
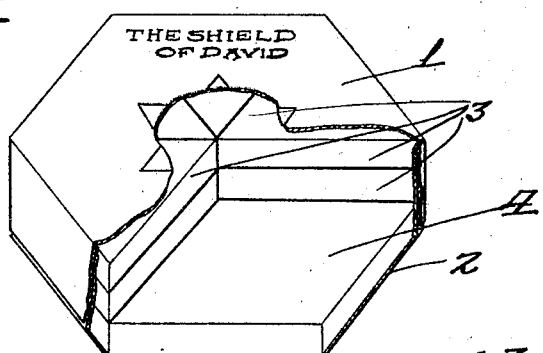
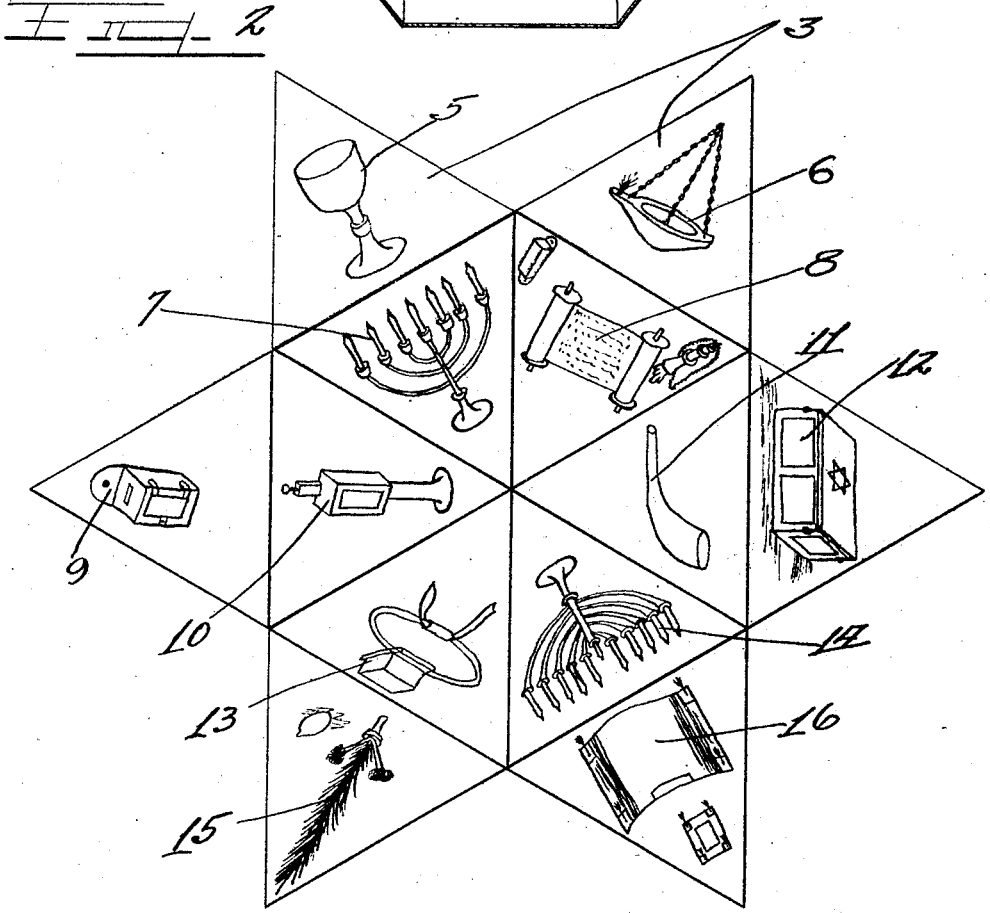

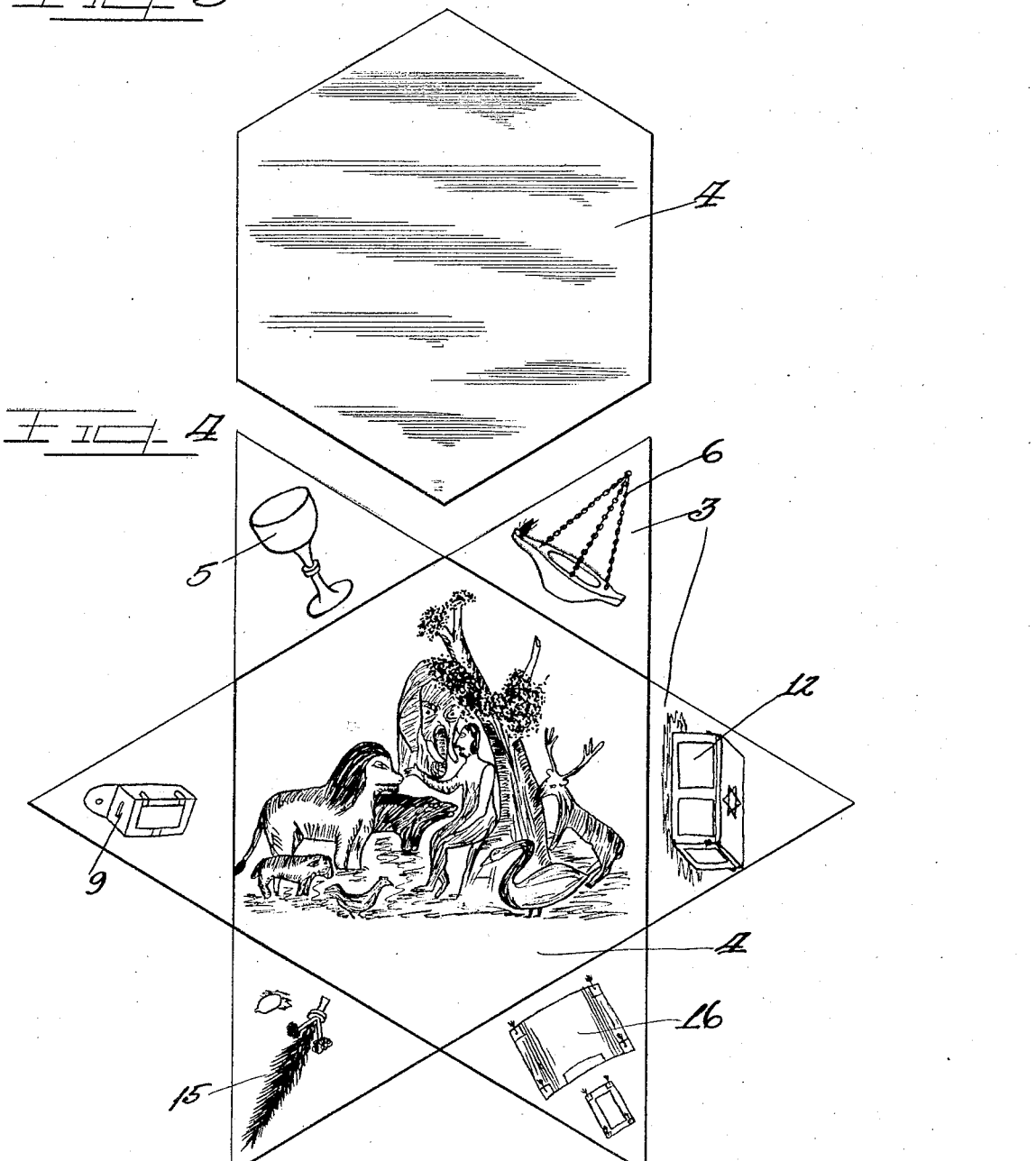

UNITED STATES PATENT OFFICE.

HERMAN HIRSCH, OF CHICAGO, ILLINOIS.

EDUCATIONAL DEVICE.

1,417,828.     Specification of Letters Patent.     Patented May 30, 1922.

Application filed February 19, 1920. Serial No. 359,988.

*To all whom it may concern:*

Be it known that I, HERMAN HIRSCH, a citizen of the United States, and a resident of the city of Chicago, in the county of Cook and State of Illinois, have invented certain new and useful Improvements in an Educational Device; and I do hereby declare that the following is a full, clear, and exact description of the same, reference being had to the accompanying drawings, and to the numerals of reference marked thereon, which form a part of this specification.

This invention relates to educational devices particularly adaptable for use by children who may thereby be more readily instructed in the symbols, salient facts, proverbs, texts or the like relating to religion, the arts or sciences.

One of the objects of the invention is to provide an improved device by which the names or symbols of things may be readily taught to children.

A further object of the invention is to provide improved means for teaching children the symbols, facts, texts and proverbs relating to religion, astronomy and so forth.

The common alphabet blocks are not particularly adapted for teaching the names of things or symbols when the numbers of such things or symbols is twelve or seven.

In various religions the number 12 enters frequently thus there were twelve tribes of Israel and twelve apostles. Many other cases of the use of twelve may be referred to, such as the twelve months of the year and the twelve signs of the zodiac.

Further, the number seven is one which frequently occurs, for example, the creation of the world was accomplished in seven days and there are seven days in the week.

The equilateral triangle and hexagon are particularly adapted for demonstrating with reference to such groups of twelve or seven. Thus, by using equilateral triangular blocks, a six-pointed star may be formed from twelve of such blocks. The placing of the blocks in the necessary relative positions to form the star gives the necessary amount of mechanical skill to give interest to the child using them and thereby aids the latter in absorbing and learning the matter imprinted thereon.

Further, by using a hexagon in connection with equilateral triangles a six-pointed star may be formed of seven blocks, the hexagon representing the most important of the group of seven, such as the sabbath day as compared with the other days in the week.

Similarly, by using a hexagon and three triangles a large triangle may be formed. In other cases the hexagon alone may be used to represent all seven objects, the six sides corresponding to the lesser important objects in the group while the center contains the name or symbol of the most important of the seven.

Other combinations than the above may be used, if desired, for example by placing an equilateral triangle opposite every other side of the hexagon.

On the drawings:

Figure 1 shows an entire device in folded relation, partly broken away, embodying the features of the present invention.

Figure 2 shows the triangular blocks spread in the form of a six-pointed star.

Figure 3 shows the hexagonal block forming part of the device.

Figure 4 shows the hexagon used in conjunction with the triangular blocks.

As shown in the drawings:

The device comprises a box of hexagonal form having upper and lower telescoping parts 1 and 2. Adapted to fit within the box are twelve equilateral triangular blocks 3, arranged to form a pair of superimposed hexagons as shown in Figure 1. Preferably the box also contains a hexagonal block 4 having sides of the same length as the triangular blocks.

As an example of one use of the device, each of the twelve triangular blocks is shown with a symbol of the Jewish faith imprinted thereon. Thus 5 represents the wine cup, 6 the ever-burning light, 7 the sabbath lights, 8 the book of the Law, 9 the charity box, 10 the spice box, 11 the trumpet or ram's horn, 12 the altar, 13 the phylactery, 14 the chanuka lights, 15 the palm branch and 16 the prayer robe or shawl. On the reverse or the same side of the blocks 3 may be printed the names of the twelve tribes, suitable texts and (or) additional symbolic matter.

The blocks, arranged as shown in Figure 2, represent the star or shield of David composed of twelve equal parts representing the twelve tribes of Israel.

The hexagonal block may be printed to represent the creation, the central portion being illustrative of the creation of man on one of the seven days whilst the six sides represent the other six days occupied by the creation of the world and the animal kingdom, and the day of rest.

I am aware that numerous details of construction may be varied through a wide range without departing from the principles of this invention, and I therefore do not purpose limiting the patent granted otherwise than necessitated by the prior art.

I claim as my invention:

In combination, twelve triangular blocks, a hexagonal block and a hexagonal box, all the sides of all of the blocks being equal, and all the blocks having the same thickness, the interior diagonal of the box being equal to that of the hexagonal block and the depth of the box being three times the thickness of blocks, a symbol on one face of each triangular block and a legend on the opposite face thereof, all of said symbols and legends being different, a picture on one side of said hexagonal block, and a representation on the cover of the box of the star-shaped figure that can be formed from the blocks, whereby the twelve triangular blocks may be formed into two hexagons and positioned on the hexagonal block to fit in the box and whereby a six-pointed star may be formed either from the twelve triangular blocks or from six of them and the hexagonal block.

In testimony whereof I have hereunto subscribed my name in the presence of two subscribing witnesses.

HERMAN HIRSCH.

Witnesses:
 RIDSDALE ELLIS,
 EARL M. HARDINE.